US011675045B2

(12) United States Patent
Weldum (10) Patent No.: US 11,675,045 B2
(45) Date of Patent: *Jun. 13, 2023

(54) METHOD AND APPARATUS FOR ADAPTIVELY FILTERING RADAR CLUTTER

(71) Applicant: SRC, Inc., North Syracuse, NY (US)

(72) Inventor: David L. Weldum, Jamesville, NY (US)

(73) Assignee: SRC, Inc., North Syracuse, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 16/866,800

(22) Filed: May 5, 2020

(65) Prior Publication Data
US 2020/0271754 A1    Aug. 27, 2020

Related U.S. Application Data

(63) Continuation of application No. 15/624,109, filed on Jun. 15, 2017, now Pat. No. 10,690,749.

(51) Int. Cl.
*G01S 13/931* (2020.01)
*G01S 7/292* (2006.01)
(Continued)

(52) U.S. Cl.
CPC ............ *G01S 7/2922* (2013.01); *G01S 7/412* (2013.01); *G01S 7/414* (2013.01); *G01S 13/91* (2013.01)

(58) Field of Classification Search
CPC ........ G01S 13/91; G01S 7/2922; G01S 7/412; G01S 7/414
See application file for complete search history.

(56) References Cited

U.S. PATENT DOCUMENTS 5,280,289 A * 1/1994 Root ................... G01S 13/5244
                                                342/91
5,990,824 A * 11/1999 Harrison ............... G01S 13/524
                                                342/36
(Continued)

FOREIGN PATENT DOCUMENTS

CN        102721954        9/2017
JP        H0496085 U    *  8/1992

OTHER PUBLICATIONS

Naqvi et al. Signal Filtering Technique to Remove Doppler Clutter Caused By Wind Turbines. Microwave and Optical Technology Letters. vol. 54, No. 6, Jun. 2012.
(Continued)

*Primary Examiner* — Timothy A Brainard
(74) *Attorney, Agent, or Firm* — George McGuire (57) ABSTRACT

A method of processing a radar hit from an object using, for each of a plurality of cells, a signal strength threshold, a hit rate threshold, a time of last detection; and receiving, for one of the plurality of cells corresponding to the object, a measured signal strength, a measured hit rate and a time of measurement. The object is identified as clutter if the measured hit rate is greater than the hit rate threshold, and the measured signal strength is less than signal strength threshold. The signal strength threshold is above a conventional CFAR signal threshold. Measured Doppler strength may also be used to identify clutter. Identification can be determined using Doppler-polarity-specific data values. The hit rate and the mean Doppler speed of the one of the plurality of cells can be updated using a running average.

21 Claims, 11 Drawing Sheets

(51) Int. Cl.
    *G01S 7/41*    (2006.01)
    *G01S 13/91*   (2006.01)

(56) References Cited

U.S. PATENT DOCUMENTS

| | | | |
|---|---|---|---|
| 8,105,028 B2 | 1/2012 | Rugger | |
| 8,344,937 B2 | 1/2013 | Drake et al. | |
| 8,860,604 B2 | 10/2014 | Oswald | |
| 9,121,941 B2 | 9/2015 | Edwards | |
| 9,372,263 B2 | 6/2016 | Oswald et al. | |
| 10,690,749 B2 * | 6/2020 | Weldum | G01S 13/91 |
| 2011/0223031 A1 | 9/2011 | Bond | |
| 2012/0105272 A1 | 5/2012 | Moruzzis et al. | |
| 2014/0043185 A1 * | 2/2014 | Quellec | G01S 7/414 |
| | | | 342/146 |
| 2015/0109165 A1 * | 4/2015 | Holder | G01S 7/0235 |
| | | | 342/159 |
| 2015/0349917 A1 | 12/2015 | Skaaksrud | |
| 2016/0124084 A1 * | 5/2016 | Lim | G01S 13/931 |
| | | | 342/160 |
| 2016/0154091 A1 * | 6/2016 | Yosoku | G01S 7/0232 |
| | | | 342/201 |
| 2017/0097412 A1 * | 4/2017 | Liu | G01S 7/415 |

OTHER PUBLICATIONS

Palmer et al. Wind Turbine Clutter Mitigation using Fully Adaptive Arrays. Proceedings of the 5th European Radar Conference.
Gallardo-Hernando, et al. "Detection and mitigation of wind turbine clutter in C-Band meteorological radar". IEEE Paper 05514421, 2010.
Kong et al. "Wind Turbine Clutter Mitigation for Weather Radar by Adaptive Spectrum Processing". IEEE Paper 06212187, 2012.
Nai et al. "Range Doppler Domain Signal Processing to Mitigate Wind Turbine Clutter". IEEE Paper 05960655, 2011.
Perry et al. "Wind Farm Clutter Mitigation in Air Surveillance Radar". IEEE Paper 04285990, 2007.

* cited by examiner

METHOD AND APPARATUS FOR ADAPTIVELY FILTERING RADAR CLUTTER

CROSS REFERENCED TO RELATED APPLICATION DATA

This application is a continuation of co-pending U.S. patent application Ser. No. 15/624,109, filed Jun. 15, 2017, which is incorporated herein by reference in its entirety.

FIELD

Methods and apparatus for filtering radar clutter, and more particularly, methods and apparatus for adaptively filtering radar clutter.

BACKGROUND

Air surveillance systems (also referred to herein as radar systems) are designed to produce an accurate display of information related to flying objects in a selected field of operation (i.e., an airspace).

Figure 1:
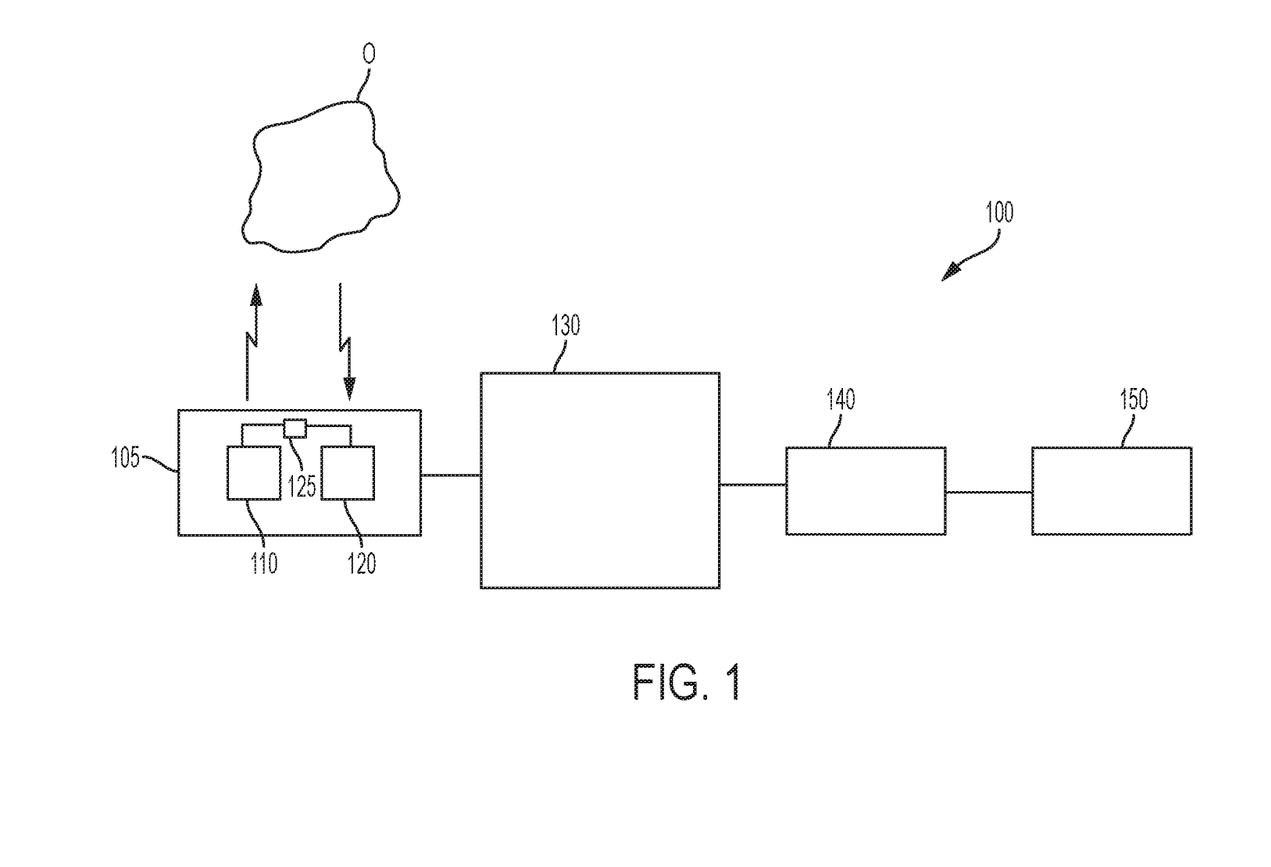
FIG. 1 is a block diagram of a conventional radar system.

FIG. 1 is a block diagram of a conventional radar system 100, which comprises hardware 105 (including a transmitter 110, a receiver 120 and an antenna 125), a processor 130, a target tracker 140 and a display 150. Transmitter 110 emits radio waves, detector 120 receives the radio waves after they are reflected from an object O and converts the waves into an electric signal, and processor 130 is programmed to analyze the received signals. Processor 130 identifies signal characteristics (e.g., signal strength and Doppler values) and identifies the characteristics with a location in space (i.e., a cell) and a time of detection.

The airspace of a radar system may be divided into 100,000 or more cells, each cell being identified using a radial value and an azimuthal value. A radar system is designed to determine, with the desired accuracy, for each cell, whether there is relevant information (i.e., a flying object) to be displayed. A signal that has been identified as coming from a flying object is referred to herein as a "hit."

To avoid displaying non-relevant objects (e.g., geographical features, weather, and noise), processor 130 of a radar systems is commonly provided with clutter suppression features. To avoid displaying noise, conventional radar systems, such as system 100, include a constant false alarm rate (CFAR) system. A CFAR system is conventionally implemented as either a cell averaging threshold (i.e., a spatial average), or a time averaging threshold via a finite impulse response filter, to eliminate signal values associated with noise, which is relatively low compared to reflected signals originating from transmitter 110. Accordingly, the signal strength threshold of the CFAR system is relatively low. To suppress signal returns from stationary objects (e.g., mountains, buildings and other ground clutter), radar systems may be provided with a coherent moving target indicator (MTI) or a coherent Doppler processor; and a clutter map may be present to address slowly changing artifacts such as those that might arise due to solar heating or weather phenomena. Particularly troublesome for conventional radar systems are non-flying objects that move at relatively high speeds and present varying radar reflection characteristics (e.g., varying signal strength and/or Doppler speeds), but which are not relevant for display, such as windmills, and wind-swept tree leaves and tall grass. Such objects are referred to herein as moving clutter.

To achieve an accurate representation of relevant objects requires, both, avoidance of display of non-relevant information and avoidance of omission of relevant information. Typical design goals require that a radar system detect and display an object on 90% of chances (i.e., in 9 out of ten scans), and avoid displaying information in the event that nothing is present (i.e., avoid false alarms) 99.999% of the time averaged over all cells in the airspace in aggregate.

Various enhancements to clutter suppression systems have been added to address the issue of windmills. For example, such systems may simply filter based on the Doppler velocity or process outputs using signals from two radar systems or recognize and eliminate signals corresponding to a known reflection signature or alter the operation of the windmill to facilitate detection and filtering.

Such enhanced systems have limitations in ability to accurately display data, as well as limitations in their ease of implementation.

SUMMARY

According to aspects of the present invention a first software module processes raw signals from hardware to identify characteristics associated with particular cells (e.g., signal strength and speed), and outputs of the first software module are processed using a second software module to determine the presence of a non-flying object (e.g., windmills) which may be eliminated from presentation on a display. According to aspects of the invention the second module uses an adaptive method of filtering to set a signal strength threshold such that, if characteristics of a signal associated with an object change with time, information can still be accurately displayed or eliminated from presentation. The signal strength threshold of the second module has a greater value than that of any threshold in the first module. It will be appreciated that, in some embodiments, the second module is positioned after the first module in the flow of processing data. It will also be appreciated that, due the positioning of the second module in the flow of data, an advantage of some aspects of the invention is that existing radar systems can be relatively easily retrofitted to achieve advantages of the aspects of the present invention.

In accordance with one aspect of the present invention, there is provided a method of processing a radar hit from an object, comprising: providing, for each of a plurality of cells, a signal strength threshold, a hit rate threshold, a time of last detection; receiving, for one of the plurality of cells corresponding to the object, a measured signal strength, a measured hit rate and a time of measurement; identifying the object as clutter if the measured hit rate is greater than the hit rate threshold, and the measured signal strength is less than signal strength threshold; and updating the time of last detection, and updating the hit rate of the one of the plurality of cells using a running average of the hit rate.

In some instances, the method further comprises providing a mean Doppler speed for each of the plurality of cells; receiving, for the one of the plurality of cells, a measured Doppler speed; and the step of identifying the object as clutter further requiring that the measured Doppler speed is less than a pre-determined factor of the mean Doppler speed for the object to be identified as clutter.

The running average may be calculated using one of an infinite impulse response filter and a finite impulse response filter.

In some instances, the step of updating may further comprise updating the signal strength threshold based on the hit rate of the one of the plurality of cells. The updating of the signal strength threshold may be based on a linear relationship between the measured hit rate and the signal strength threshold. The signal strength threshold may be increased at a rate of ⅔ of an increase in the measured hit rate.

In some instances, the step of providing constitutes a first step of providing corresponding to a first polarity of Doppler speed, the method further comprising: providing a mean Doppler speed for the first polarity of Doppler speed; providing for a second polarity of Doppler speed, for each of a plurality of cells, a signal strength threshold, a hit rate threshold, a mean Doppler speed, and a time of last detection; receiving a measured Doppler speed; and determining that the Doppler speed has one of a first polarity and a second polarity. In the step of identifying, for the object to be identified as clutter, the hit rate threshold is the hit rate threshold of the one of a first polarity and a second polarity, the signal strength threshold is the signal strength threshold of the one of a first polarity and a second polarity, and the measured Doppler speed is less than a pre-determined factor of the mean Doppler speed for the one of a first polarity and a second polarity.

In some instances, the time of last detection, the measured hit rate, and a time of measurement, all correspond to a Doppler speed of a first polarity, and the method further comprises: maintaining, for each of the plurality of cells, the time of last detection, the measured hit rate, and a mean Doppler speed, corresponding to the Doppler speed of the first polarity; and maintaining, for each of the plurality of cells, a time of last detection, a measured hit rate, and a mean Doppler speed, corresponding to the Doppler speed of a second polarity that is opposite of the first polarity.

In some instances, the method further comprises maintaining, for each of the plurality of cells, a time of last update; and determining, for one of the plurality of cells, in the absence of a hit in the one of the plurality of cells, if the time of last update is greater than the inverse of the hit rate; and if the time of last update is greater than the inverse of the hit rate, updating the hit rate.

In some instances, the measured signal strength that is received in the step of receiving is signal strength above a CFAR signal strength threshold.

The signal strength threshold may be the same for each of the plurality of cells. The signal strength threshold for at least two of the plurality of cells may be different than one another.

In accordance with another aspect of the present invention, there is provided a computer program stored on a non-transient storage medium and adapted to be run on a computer processor for processing a radar hit from an object, comprising code for: receiving, for one of the plurality of cells corresponding to the object, a measured signal strength, a measured hit rate and a time of measurement; identifying the object in the one of a plurality of cells of a radar field as clutter if the measured hit rate is greater than a hit rate threshold, and the measured signal strength is less than a signal strength threshold; and updating the measured hit rate using a running average of the hit rate.

In some embodiments, the program further comprises receiving, for the one of the plurality of cells, a measured Doppler speed; and the step of identifying the object as a clutter further requiring that the measured Doppler speed is less than a pre-determined factor of a mean Doppler speed for the object to be identified as clutter.

In some embodiments, the running average is calculated using one of an infinite impulse response filter and a finite impulse response filter.

In some embodiments, the step of updating further comprises updating the signal strength threshold based on the hit rate of the one of the plurality of cells. The updating of the signal strength threshold may be based on a linear relationship between the measured hit rate and the signal strength threshold.

In some embodiments, the program of further comprises: determining that a measured Doppler speed of the object has one of a first polarity and a second polarity, and in the step of identifying, for the object to be identified as clutter, the hit rate threshold is a hit rate threshold of the one of a first polarity and a second polarity, the signal strength threshold is a signal strength threshold of the one of a first polarity and a second polarity, and the measured Doppler speed is less than a pre-determined factor of a mean Doppler speed for the one of a first polarity and a second polarity.

In some embodiments, the measured hit rate, and the time of measurement, each correspond to a Doppler speed of a first polarity, and the program further comprises: maintaining, for each of the plurality of cells, a time of last detection, the measured hit rate, and a mean Doppler speed, corresponding to the Doppler speed of the first polarity; and maintaining, for each of the plurality of cells, a time of last detection, a measured hit rate, and a mean Doppler speed, corresponding to a Doppler speed of a second polarity that is opposite of the first polarity.

In some embodiments, the program further comprises maintaining, for each of the plurality of cells, a time of last update; determining, for one of the plurality of cells, in the absence of a hit in the one of the plurality of cells, whether the time of last update is greater than the inverse of the hit rate; and if the time of last update is greater than the inverse of the hit rate, updating the hit rate.

The measured signal strength that is received in the step of receiving is a signal strength above a CFAR signal strength threshold; and the signal strength threshold is specified as signal strength above the CFAR signal strength threshold.

In accordance with yet another aspect of the present invention, there is provided a radar system, comprising: a transmitter to emit radio waves; a detector to receive the radio waves after they are reflected form an object, and to generate an electrical signal corresponding to the radio waves; a processor for processing the signal, comprising: a first software module to analyze the signal's characteristics and associate the signal with a cell and a time of detection; and a second software module programmed (1) to receive for a cell, a measured signal strength, a measured hit rate and a time of measurement, (2) to identifying the object as clutter if (i) the measured hit rate is greater than a hit rate threshold, and (ii) the measured signal strength is less than a signal strength threshold, and (3) to update the time of last detection, and to update the hit rate of the cell using a running average of the hit rate.

As defined herein a "computer readable storage medium" is defined as a tangible device that can retain and store instructions for use by an instruction execution device. The computer readable storage medium may be, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. Computer readable program instructions may execute entirely on the user's computer, partly on the user's computer, as a stand-alone software package, partly on the user's computer and partly on a remote computer or entirely on the remote computer or server.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or another programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term "instance" as used herein refers to an example of an implementation of a method; and the term "embodiment" as used herein refers to an example of a physical implementation of an apparatus. It will be appreciated that an instance may be implemented, for example, in a computer program stored on a non-transient storage medium or a system having a suitably programmed processor or instructions stored in a memory. Also, it will be appreciated that features of a method described with reference to system, may be practiced and claimed as a method or a computer program, apart from the system; and features of a method described with reference to a method may be practiced and claimed as an embodiment of a system.

It is to be understood that the term "speed" as used herein refers to the unambiguous speed.

These and other aspects of the present invention will become apparent upon a review of the following detailed description and the claims appended thereto.

DETAILED DESCRIPTION

Aspects of the invention will be further illustrated with reference to the following specific examples. It is understood that these examples are given by way of illustration and are not meant to limit the disclosure or the claims to follow.

Figure 2:
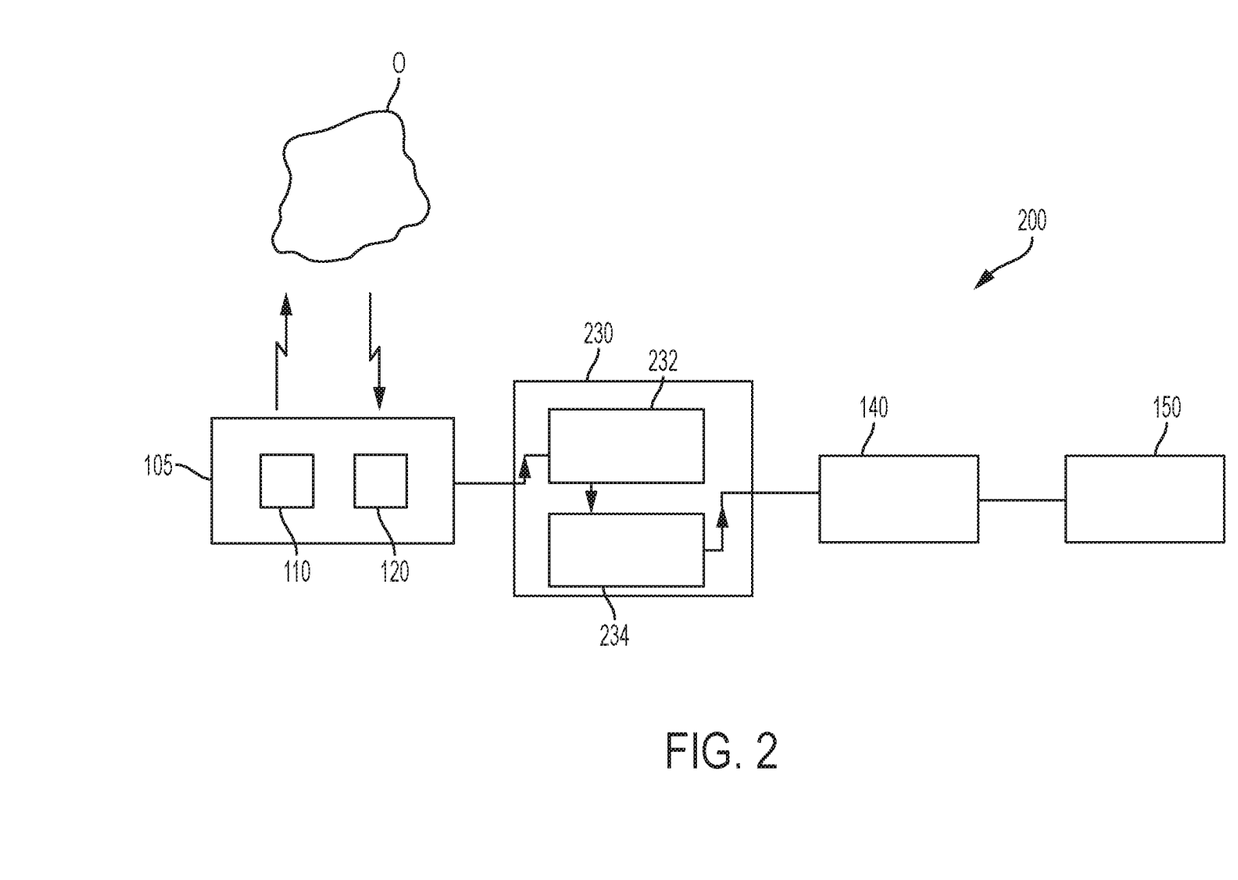
FIG. 2 is a block diagram of an example of a radar system according to aspects of the present invention.

FIG. 2 is a block diagram of an example of a radar system 200 according to aspects of the present invention, which comprises hardware 105 including a transmitter 110 and a detector 120, and a processor 230. Radar system 200 also includes a target tracker 140 for tracking objects over multiple scans, and a display 150 for presenting information to a view. Tracker 140 and display 150 may be of any currently-known or yet to be developed design.

Transmitter 110 emits radio waves, and detector 120 receives the radio waves after they are reflected from an object O. The transmitter and the detector may be embodied as any suitable devices known in the art or yet to be developed, suitable for projecting and detecting electromagnetic energy for generating signals suitable for radar technologies.

Processor 230 is programmed to analyze signals received directly or indirectly from the hardware. Computer readable program instructions to execute the methods may be stored in a computer readable storage medium (or media) usable by processor 230.

For example, a radar field from which radar system 200 receives and displays data is divided into as many as a 100,000 or 1,000,000 cells or more. The cells may be identified using polar coordinates (e.g., a radial coordinate and an azimuthal coordinate) or Cartesian coordinates or any other suitable coordinate system.

As illustrated in FIG. 2, in the example embodiment, processor 230 is programmed to have a first module 232 and a second module 234. The first module functions in a manner as described with reference to processor 130 in FIG. 1. That is, processor 130 analyzes signals received from hardware 105, and identifies signal characteristics (e.g., strength and Doppler values) that are associated (i.e., indexed) with a location in space (i.e., a cell) and a time of detection, and implements a CFAR system. Second module 234 receives the outputs from first module 232 and processes them as set forth in any embodiments described below. It will be appreciated that, although software, in the illustrated embodiment is configured as two distinct modules, such a configuration is not necessary, provided the relevant information is produced and available for processing in the manner set forth herein.

Figure 3:
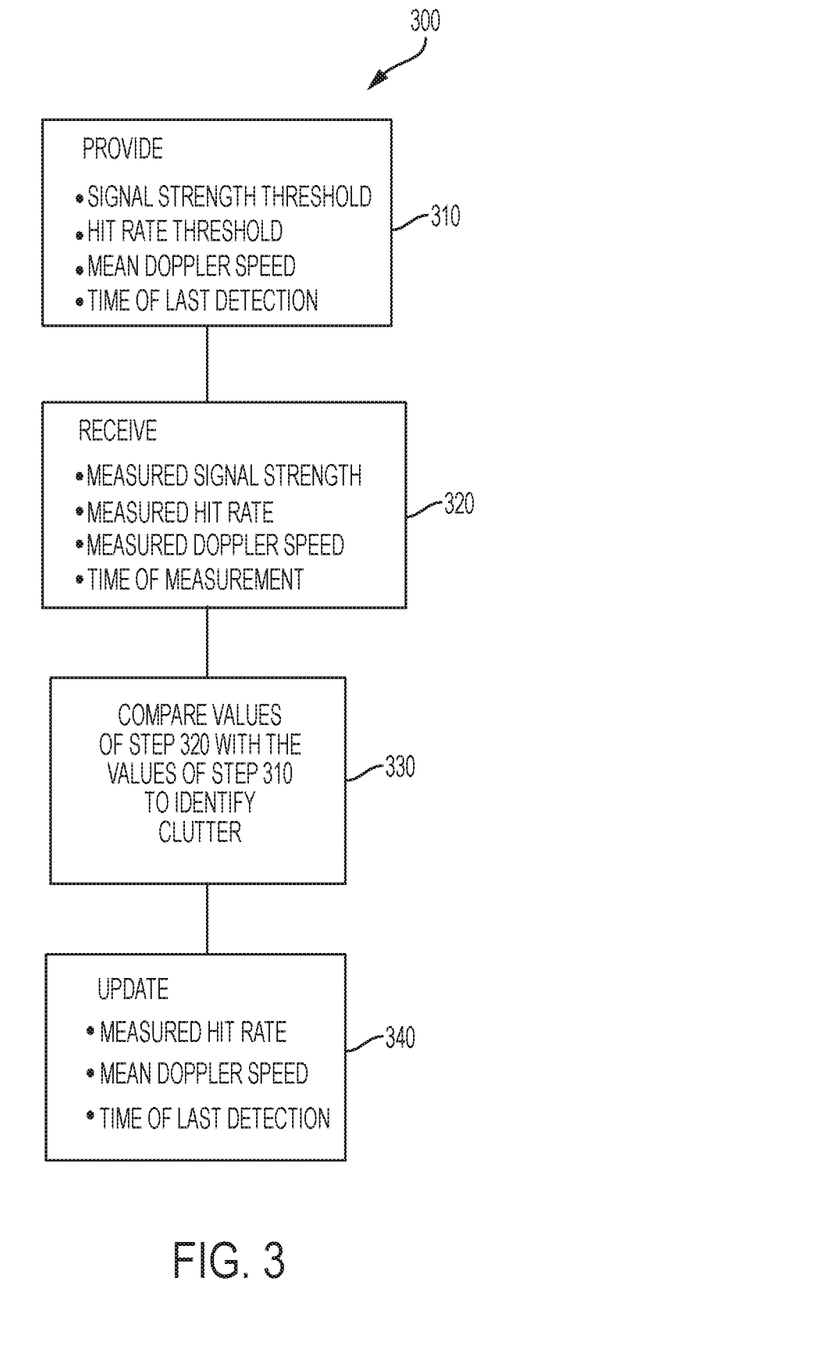
FIG. 3 is a flowchart illustrating an instance of a method of processing a radar hit according to aspects of the present invention.

FIG. 3 is a flowchart illustrating an instance 300 of a method of processing a radar hit according to aspects of the present invention. An advantage of radar systems executing methods according to aspects of the present invention is that information determined to arise from clutter can be omitted from tracking and/or display which keeps the information from obscuring other relevant information. An additional advantage is that the filter adapts to changing conditions thereby increasing the ability of a radar system to accurately display data.

In step 310, a signal strength threshold, a hit rate threshold, a mean Doppler speed, and a time of last detection are provided for each of a plurality of cells. Signal strength provided by the hardware may be indicative of the nature of the object from which reflected radiation is received. As set forth below, a threshold signal strength can be set using experimental data arising from reflecting and detecting radiation from known objects (e.g., windmills of a particular kind at a known location) or from one or more types of objects of various kinds. Thresholds used herein may be unique to a cell or common to two or more cells (including common to all cells (i.e., global in nature)). It is to be appreciated that this threshold is in addition to (and having a greater value than) the threshold for reducing noise as was described above with reference to FIG. 1

A signal for a given cell having a signal strength greater than the threshold will be omitted from further processing (i.e., processing to determine if the object is clutter will end and the hit will be displayed in the corresponding cell). As described in greater detail below, a signal strength threshold may be constant value, or may be varied based on measured values (e.g., hit rate). In some embodiments, a Doppler speed threshold may be added such that cells indicating the presence of an object having a speed outside of a range (e.g., above a certain speed) are omitted from further processing. For example, windmill speeds are commonly limited to speeds below 120 or 140 knots). Accordingly, in some embodiments, hits having a speed greater than a threshold are omitted from filtering to determine if the corresponding object is clutter and are presented for display.

A measured hit rate is a measurement of the rate at which an indication that an object is present at a given cell. A hit rate is maintained, as the number of times an object is identified by the hardware and first module 232, per unit time. A windmill, due to its being fixed to the ground and its repetitive movement (i.e., rotation), is prone to provide high hit rates for a given cell. For example, whereas a given cell having moving clutter (e.g., a windmill or windswept leaves) may have a hit rate of up to 20%, a hit rate in a given cell resulting from an aircraft, noise or stationary clutter would result in a hit rate that is several orders of magnitude less than that of moving clutter. Accordingly, there is considerable flexibility in selecting a hit rate threshold such that signals associated with clutter (e.g., a windmill) can be identified and omission of a hit associated with a relevant moving object can be avoided. Cells having a hit rate less than the hit rate threshold will be omitted from further processing under this method and objects in that cell are presented for display. The hit rate threshold may be the same for all of the cells or may be different for one or more cells.

A mean Doppler speed is the average speed detected at a given cell. A time of last detection is the last time at which a hit was detected in a given cell. It will be appreciated that an indication of a hit for the purpose of determining hit rate, a Doppler speed, and a detection time are all data that can be determined by the hardware, the first module 232 or some combination of both. Calculations of mean Doppler speed can be made by any suitable processor (e.g., processor 230 or another processor (not shown)). The values may be stored in a memory unit of a processor in a separate memory unit (not shown) and provided from the memory unit.

In step 320, a measured signal strength, a measured Doppler speed of an object, a measured hit rate and a time of measurement are received for one of the plurality of cells. As indicated above, it will be appreciated that an indication that an object is present, a Doppler speed, and a detection time are all data that can be determined by the hardware, the first module or some combination of both. A measured value refers to a current value to be compared to historical value(s) (e.g., an average value) for processing a hit.

In step 330, second module 324 compares the values of step 310 with the values of step 320 and identifies the object in a given cell as moving clutter (e.g., a windmill) if the hit rate of that cell is greater than the hit rate threshold, the measured Doppler speed is less than a factor of the mean Doppler speed of that cell, and the measured signal strength is less than signal strength threshold.

The factor of mean Doppler speed arises from a recognition that speed of an object typically has a distribution around a mean. For example, in the case of windmills, the distribution results from varying reflections received from different aspects of the blades on successive scans of the radar. Accordingly, the relevant speed threshold is determined to be a predetermined multiple of a historical mean. For example, in the case of windmills the factor is typically 2-3 times the mean. It will be appreciated that a smaller factor will result in a greater percentage of received signals being determined to be relevant for display. Further details regarding speed and distributions of speed are given below with reference to FIGS. 6A-6B below.

In step 340, the hit rate and the mean Doppler speed of the given cell is updated using a running average of the hit rate and a running average of the Doppler speed. Additionally, the time of last detection is recorded.

Figure 4:
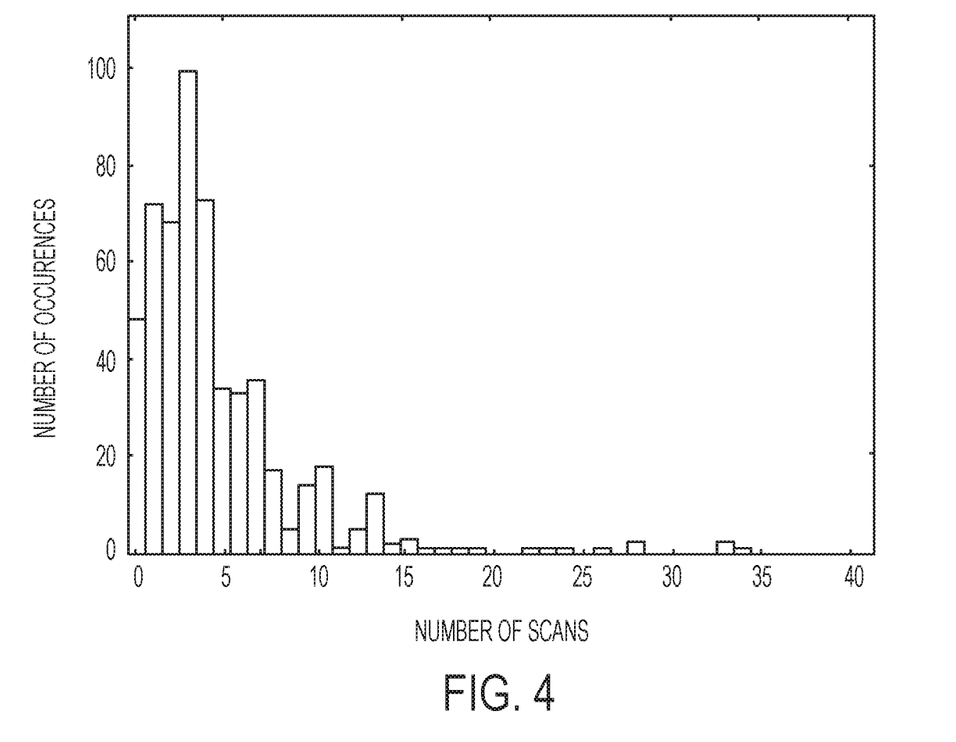
FIG. 4 is a histogram illustrating the amount of time between successive hits from a representative example of a typical windmill, as measured at a CFAR output.

FIG. 4 is a histogram illustrating the amount of time between successive hits from one representative example of a typical windmill. The units of time are measured as a number of scans by the radar hardware. It is to be appreciated that hit rate is determined using an average of times between a selected number of consecutive hits, where each scan takes given number seconds to complete.

In the example illustrated in FIG. 4, most frequently, hits occur 4 scans after the previous hit; however, there is a distribution for the number of scans between hits. Significantly, a vast majority of hits occur in the range from 1-8 hits which suggests that a hit rate calculated using an average time between a selected number hits will be fairly stable over time. Accordingly, in some embodiments of the present invention, a running average of time between hits is maintained and used to calculate hit rate.

For example, a running average for a given cell can be calculated using a finite impulse response (FIR) filter or an infinite impulse response (IIR) filter. For example, for a FIR filter, the running average of hit rate can be calculated (an updated) using the last 20 or 50 or 256 measured times between hits for the cell. For example, an IIR filter may be implemented by calculating (and updating) an average with the last measured time between hits being given a fractional weight and the previously calculate average being given a fractional weight, the two fractional values summing to one. For example, the newly measured value can be given a weight of one-eighth and the previously calculated values given a weight of seven-eighths. It will be appreciated the weights are typically selected such that the filter is able to respond relatively quickly to changes in hit rate, but not so quickly that the result is highly variable. A mean Doppler speed can be calculated in a similar manner using a running average.

Figure 5A:
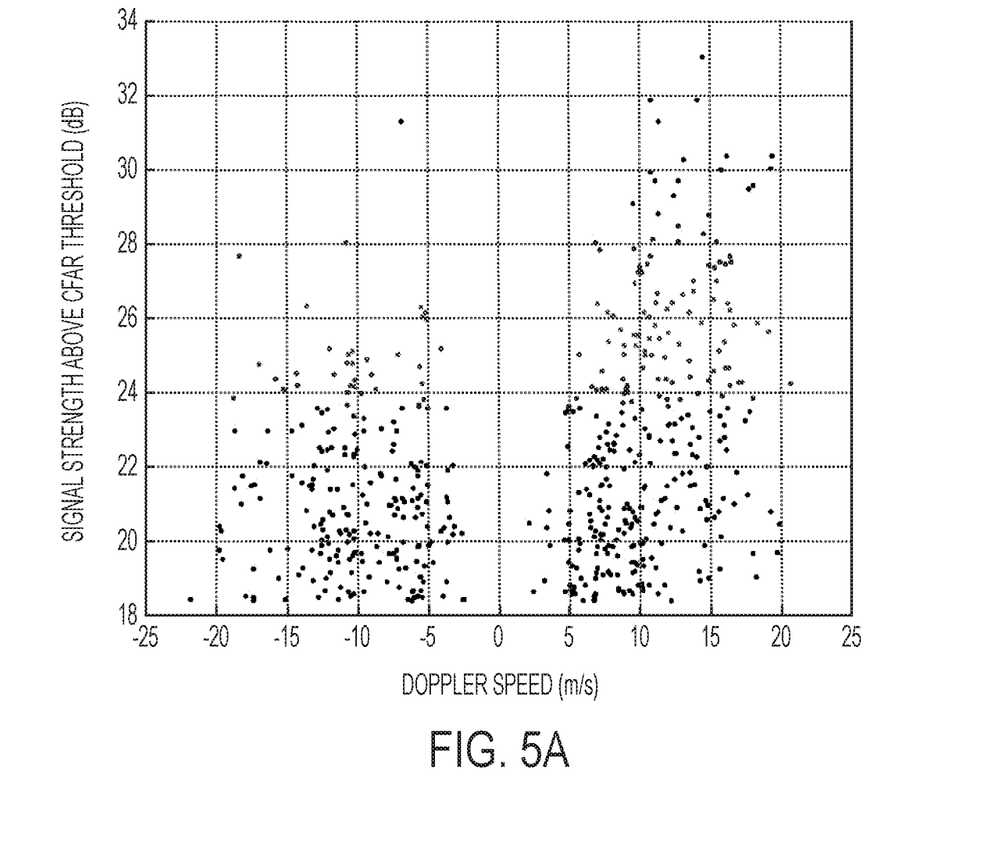
FIG. 5A is a graphical illustration showing the signal strength of individual hits as a function of measured Doppler speed in meters-per-second, for a first representative example of a windmill.

As indicated above with reference to step 320, a signal strength threshold can be used to suppress hits associated with clutter such as windmills. FIG. 5A is a graphical illustration indicating the signal strength of individual hits from a first windmill as a function of measured Doppler speed (measured in meters per second). The signal strength is measured in dB of detected power above the CFAR threshold provided by first module 232. As discussed in greater detail below, the measured speed values have positive and negative values depending on the direction of motion of the object.

The data in FIG. 5A is generally present below an identifiable signal strength value (i.e., approximately 32 dB). Accordingly, in some embodiments, second module 322 (shown in FIG. 2) is programmed to have a signal strength threshold that is a single fixed value selected to eliminate a selected percentage of hits, with the threshold selected in accordance with the allowable false alarm rate. In some embodiments, all cells in a field may have a same signal strength threshold value as one another or cells may have different values.

Figure 5B:
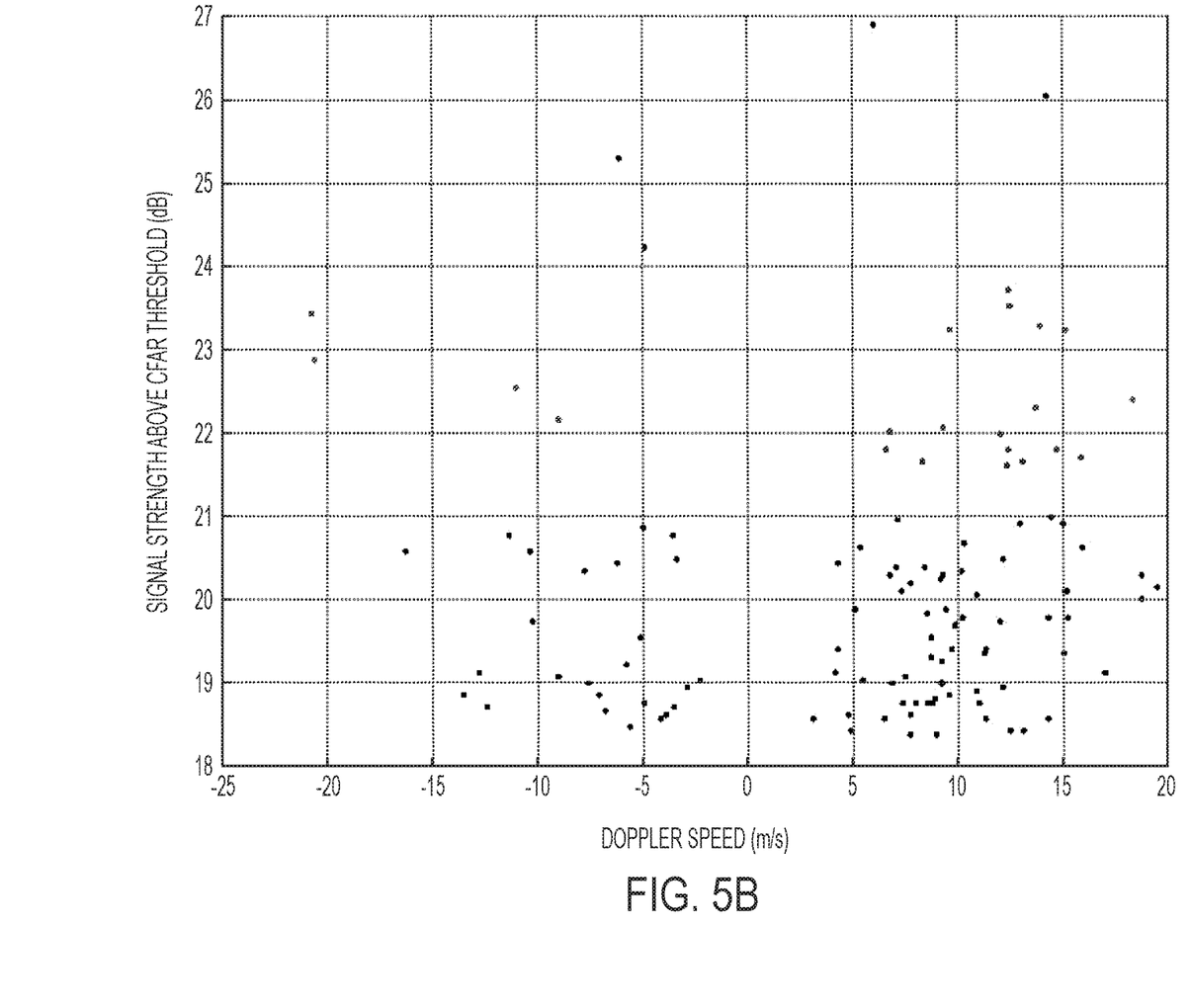
FIG. 5B is a graphical illustration showing the signal strength of individual hits as a function of measured Doppler speed in meters-per-second, for a second representative example of a windmill.

FIG. 5B is a graphical illustration indicating the signal strength of individual hits from a second windmill as a function of measured Doppler speed. Like FIG. 5A, the signal strength is measured in dB of detected power above the CFAR threshold provided by first module 232; and the data in FIG. 5B is generally present below an identifiable signal strength value (i.e., approximately 23 dB).

Upon viewing figures such as FIGS. 5A and 5B, the inventors further determined that the threshold necessary to maintain an allowable false alarm rate in each cell varied among cells, in some instances varied considerably, and therefore the threshold could be individually set for each cell, to reduce the likelihood of an excessive threshold causing a hit from an aircraft to be suppressed. For convenience, the threshold increase over the CFAR threshold for a given cell will hereinbelow be referred to as the CTI (cell threshold increase).

Figure 5C:
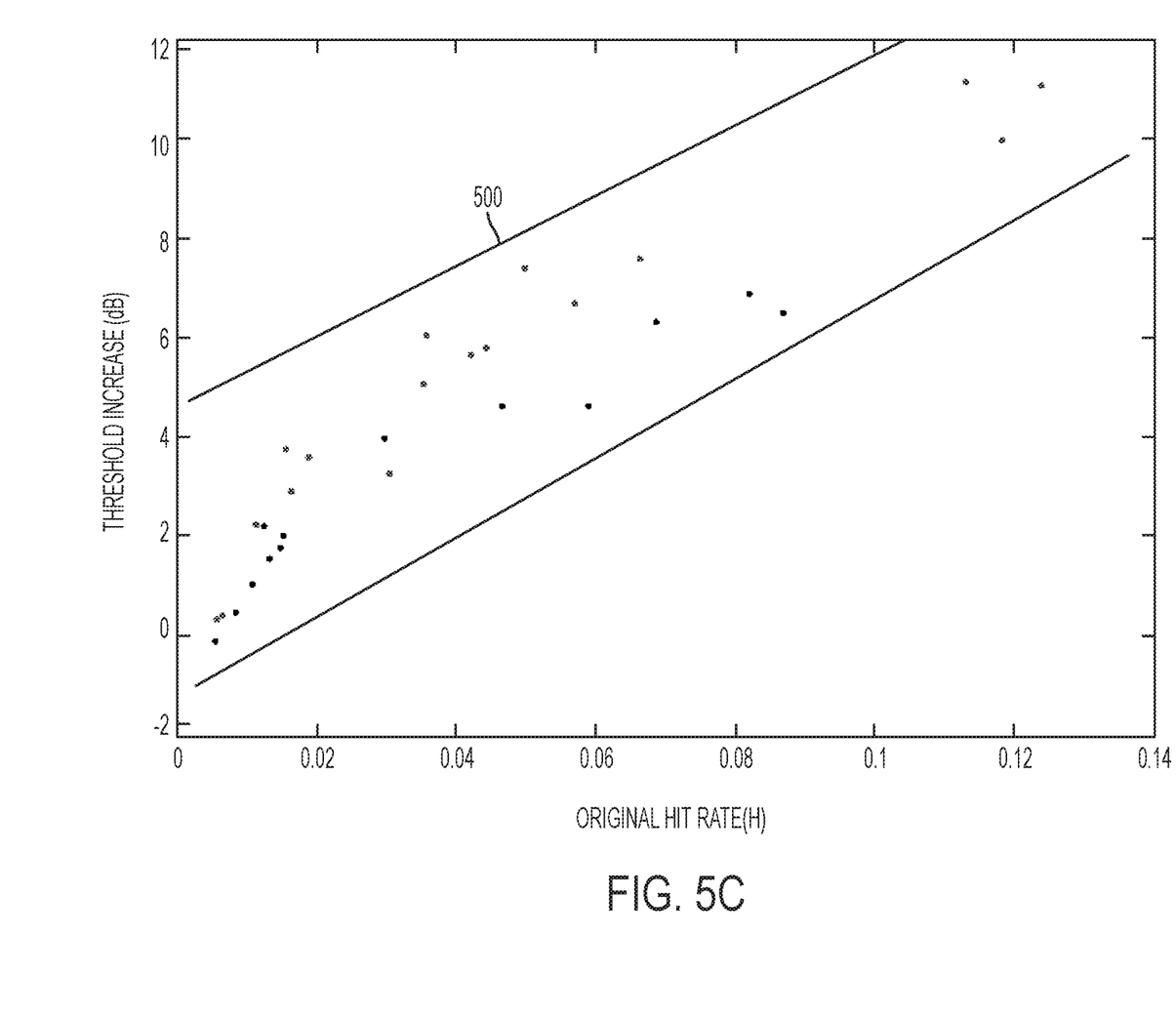
FIG. 5C, is a graphical illustration of data from multiple windmills, each point showing the hit rate output from the first module and signal strength threshold necessary to achieve a 0.5% hit rate for a given one of the multiple windmills.

A surprising observation of the inventors became apparent when the CTI was plotted as function of the measured hit rate in each cell containing windmills. As is apparent from FIG. 5C, there is a relatively strong linear correlation between the hit rate from a windmill and the CTI necessary to maintain an allowable false alarm rate. FIG. 5C illustrates a relatively strong, linear correlation between signal strength and hit rate. Accordingly, the inventors have determined that, in some embodiments, it is advantageous to adjust the signal strength threshold of each cell based on measured hit rate of that cell; and in some embodiments, the signal strength threshold 500 of a cell is varied linearly based on measured hit rate of the cell. As indicated above, it is to be appreciated that the threshold of second module 234 is a threshold that is specified in decibels above the threshold provided by the CFAR system provided in the hardware and/or the first software module 232 (shown in FIG. 1).

The following is a description of an example of a technique for specifying a linear, signal strength threshold 500 specified as a function of measured hit rate. Since there is a distinct linear correlation between the hit rate and CTI associated with the hits, the threshold may be specified using a linear equation with measured hit rate as the independent variable and CTI as the dependent variable.

In FIG. 5C, it is apparent that the slope between original hit rate (H) (i.e., the hit rate output from the first module) and the CTI is approximately ⅔. A further, surprising observation of the inventors is that a slope having a magnitude of ⅔ between the CTI and the original hit rate is invariant over a wide range of range of windmill models and designs. Accordingly, the signal strength threshold 500 varies with a slope of ⅔ (indicated with the letter L in equation 1). In order to specify a linear equation representing the relationship between measured hit rate and CTI, a value of the y-intercept is needed. FIG. 5C shows the CTI necessary to maintain a hit rate of 0.5% (i.e., 0.5 hits per 100 scans) in each of many different cells. Depending on the radar characteristics and requirements, a per cell hit rate of 0.5% may be too high or too low, so the inventors similarly analyzed the CTI necessary to maintain a variety of hit rates. In each case the ⅔ slope was observed, with the y-intercept varying as a function of the desired hit rate. It was determined that the y-intercept could be specified by a constant K, which is chosen for a desired hit rate.

$$S=L*H+K \qquad \text{Equation 1}$$

It will be appreciated that, in some embodiments, in step 340 (shown in FIG. 3), for a given cell, the signal strength threshold is updated according to Equation 1, based on hit rate for that cell. Typically, the update of the signal strength threshold occurs after the hit rate is updated in step 330, so that the updated hit rate is accounted for in the signal strength threshold calculation.

Figure 6A:
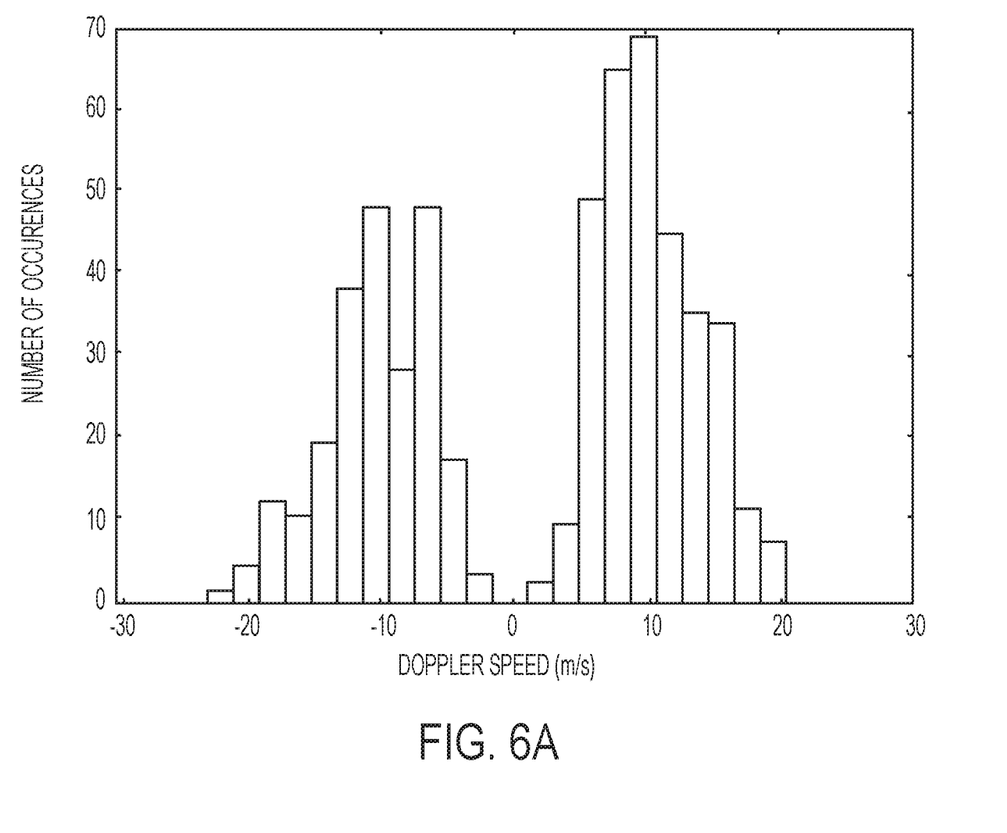
FIG. 6A is a graphical illustration of a distribution of measured speeds (meters/second) from a given representative example of a windmill when the windmill is unobscured from a radar system.
Figure 6B:
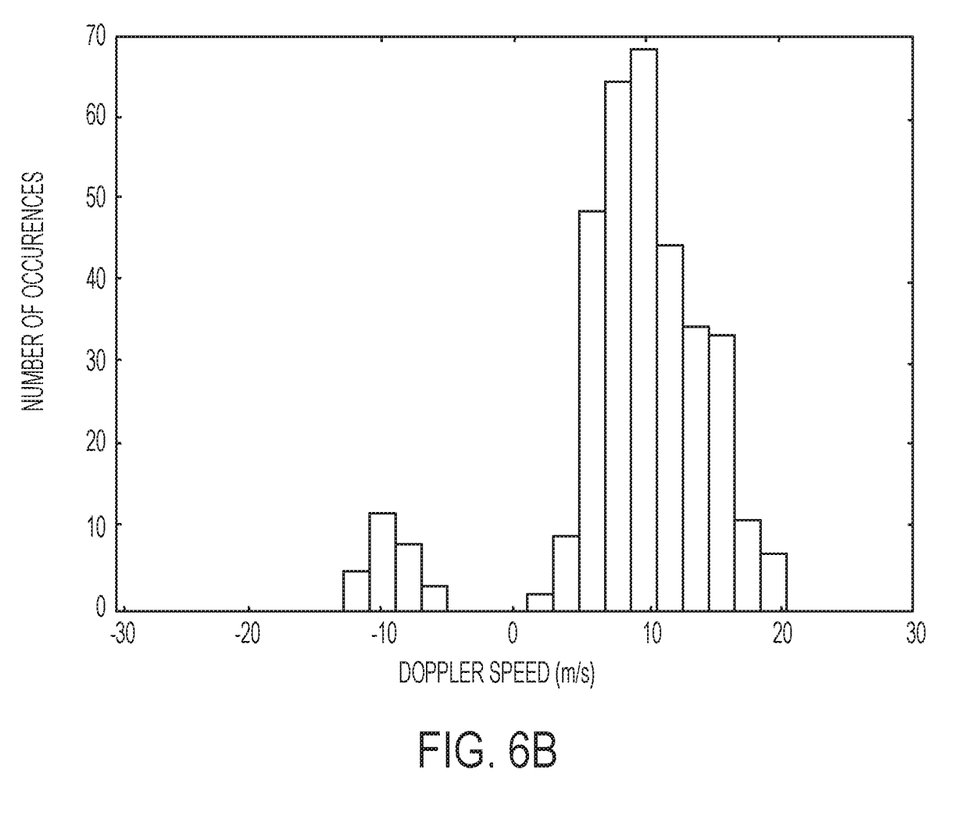
FIG. 6B is a graphical illustration of a distribution of measured speeds (meters/second) showing how the distribution would appear when an upper or lower half of a windmill is partially obscured.

Further, optional features of methods of processing hits according to aspects of the present invention are given below. In some instances, a given object will provide both negative and positive Doppler shifts. For example, as shown in FIG. 6A, the blades at the top of a windmill cause shifts of a first polarity (e.g., positive shifts) and the blades at the bottom of the windmill cause shifts of a second polarity, opposite to the first polarity (e.g., negative shifts), resulting in a distribution Doppler shifts that symmetric about a speed of 0. If the windmill is unobscured, as shown in FIG. 6B, a velocity measured for a cell impacted by the windmill may have positive or negative shifts associated with it; however, the distribution of the shifts will be substantially equally distributed about 0. By contrast, if a windmill is obscured (e.g., by a hill or a tree), the shifts may be unequally distributed about zero. In the extreme, the entire bottom half of the windmill is obscured, such that the measured values of a first polarity would have a distribution, and there would be zero measurements of the opposite polarity.

In some embodiments, to address instances of partial obscuring of a windmill, it is advantageous to have associated with each cell a first set of values (hit rate, average Doppler speed, and time of last detection) corresponding to hits having a positive Doppler shift, and a second set of values corresponding to negative Doppler shift, with separate calculations made for each polarity. Accordingly, when determining whether a given hit is from a windmill, the calculations would be based only on hits of a same polarity as the currently measured hit. An example of an advantage of using such polarity-specific calculations is as follows. If there is a partially obscured windmill such that, for a given cell corresponding to the windmill, a hit rate is high enough to reach the hit rate threshold for only one Doppler shift polarity, in the event that a hit corresponding to a flying object were to arrive in that cell, the flying object having a Doppler shift polarity the same as the obscured portion of the blades, the radar system would more readily avoid erroneous omission of the hit from display. It is to be appreciated that, in such a circumstance, the hit rate corresponding to the polarity of the obscured blades would be low enough that the flying object would not be omitted from display.

Figure 7:
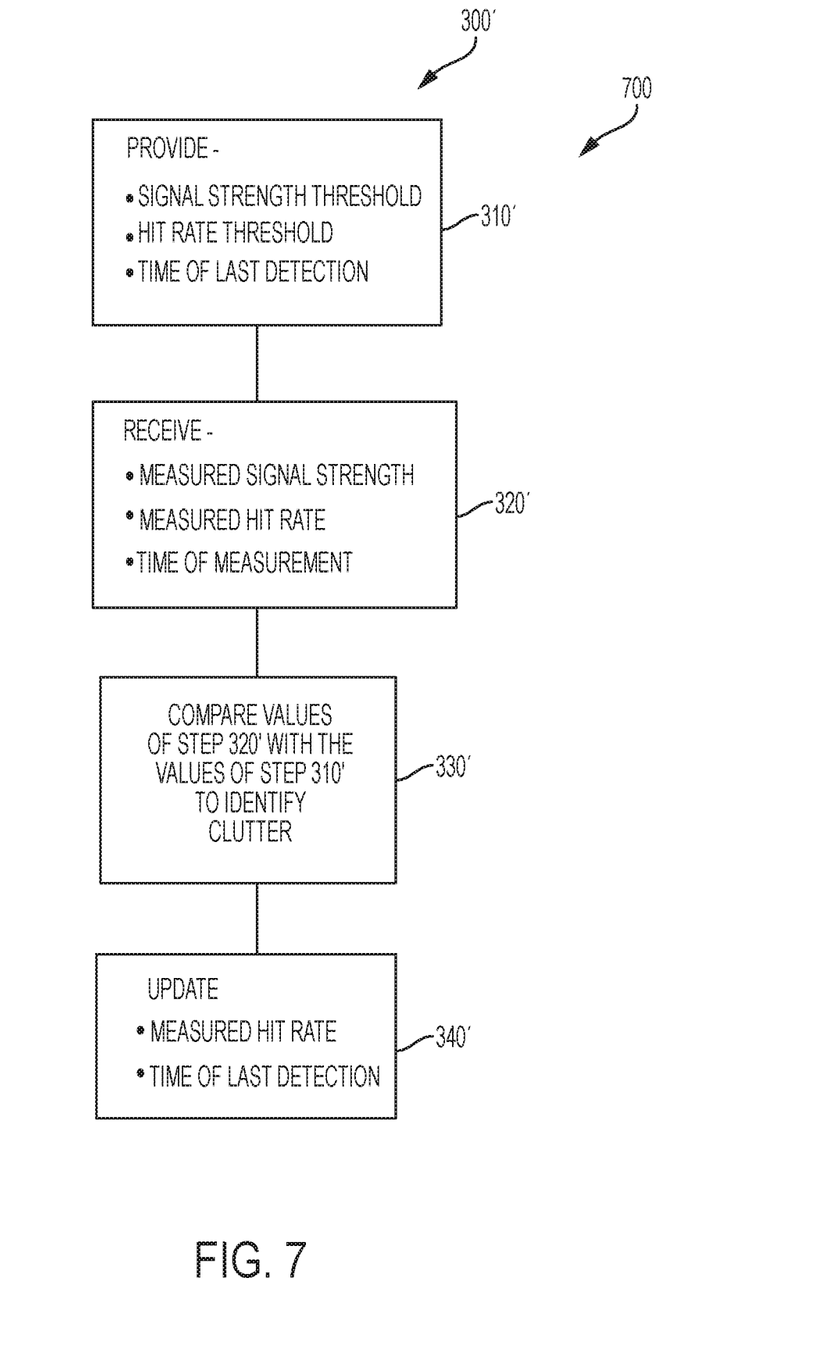
FIG. 7 is a flowchart illustrating another instance of a method of processing a radar hit, according to aspects of the present invention.

In some embodiments, aspects of the invention are used with non-Doppler radar (i.e., the radar system does not measure Doppler speed); and in some embodiments, it may be chosen to use a method of processing hits that does not rely on Doppler speed values. FIG. 7 is a flowchart illustrating another instance 300' of a method of processing radar hits according to aspects of the present invention. In instance 300', the filter is operated without the use of Doppler speed values. Each of the steps 310'-340' is the same as a corresponding step in method 300 as described above, except that the use of Doppler speed is omitted. It will be appreciated that, in methods according this aspect of the invention, a determination of the presence of clutter in a given cell is made based on hit rate, not Doppler speed.

In some embodiments, the method of FIG. 3 or the method of FIG. 7 is used in conjunction with a method of updating cells even when a hit is not provided by the radar system in the cells. It will be appreciated that the method of FIG. 3 or FIG. 7 updates a cell only when a hit occurs for that cell and as a result, cells which do not have a hit for an extended period of time can have hit rates and corresponding signal strength threshold values associated with them that remain high for an extended period of time. The result may be an erroneous omission of the hits from display (i.e., a failure to display a relevant object). Accordingly, in some instances, execution of a method of updating in the absence of a hit, in conjunction with the method of FIG. 3 or FIG. 7, may increase the likelihood of detection of the flying object.

Figure 8:
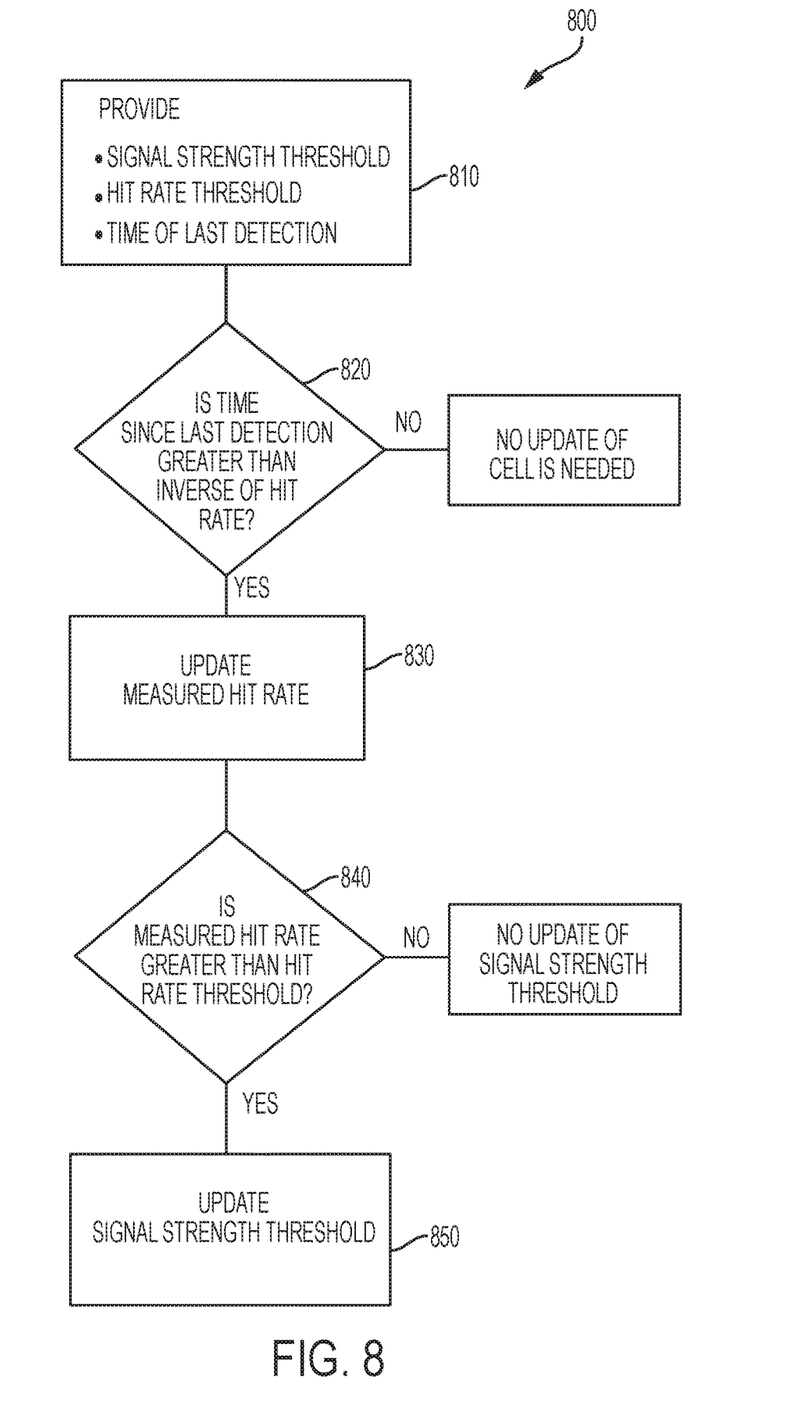
FIG. 8 is a flowchart illustrating an instance of a method of updating cells in the absence of a radar hit, according to aspects of the present invention.

FIG. 8 is a flowchart illustrating an instance 800 of a method of updating cells in the absence of a radar hit according to aspects of the present invention. For example, the method of updating in the absence of a hit may be executed, on a periodic basis, for all or a subset of cells in a given radar field on a periodic basis. In some embodiments, the method may be executed on all cells in a given field once every scan period of the radar system.

In step 810, a signal strength threshold, a hit rate threshold, and a time of last detection/update are provided for a given cell.

At step 820, a determination is made whether an update is due based on the time since the last detection/update. It is determined if the time since the last detection/update does not exceed the inverse of the hit rate associated with that cell, no updating the cell values occurs. On the other hand, if the time since the last detection/update exceeds the inverse of the hit rate, the hit rate is updated as set forth below.

At step 830, the hit rate is updated as described above with reference to step 340. At step 840, a determination is made as to whether the updated hit rate exceeds the hit rate threshold. If the updated hit rate does not exceed the hit rate threshold, then no further action is taken. On the other hand, if the updated hit rate does exceed the hit rate threshold in step 850, the signal strength threshold is updated as described above.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method of processing a radar hit from an object, comprising:

providing, for each of a plurality of cells, a signal strength threshold, a hit rate threshold, a time of last detection;

receiving, for one of the plurality of cells corresponding to the object, a measured signal strength, a measured hit rate and a time of measurement;

determining whether the measured hit rate is greater than the hit rate threshold, and the measured signal strength is less than the signal strength threshold;

identifying the object as clutter upon determining the measured hit rate is greater than the hit rate threshold, and the measured signal strength is less than signal strength threshold; and updating the time of last detection, and updating the hit rate of the one of the plurality of cells using a running average of the hit rate.

2. The method of claim 1, further comprising:
providing a mean Doppler speed for each of the plurality of cells;
receiving, for the one of the plurality of cells, a measured Doppler speed; and
the step of identifying the object as clutter further requiring that the measured Doppler speed is less than a pre-determined factor of the mean Doppler speed for the object to be identified as clutter.

3. The method of claim 1, wherein the running average is calculated using one of an infinite impulse response filter and a finite impulse response filter.

4. The method of claim 1, wherein the step of updating further comprises updating the signal strength threshold based on the hit rate of the one of the plurality of cells.

5. The method of claim 4, wherein the updating of the signal strength threshold is based on a linear relationship between the measured hit rate and the signal strength threshold.

6. The method of claim 5, wherein the signal strength threshold is increased at a rate of ⅔ of an increase in the measured hit rate.

7. The method of claim 1, wherein the measured signal strength, the measured hit rate and the time of measurement of each of the plurality of cells are based on hits having a Doppler polarity the same as a Doppler of a currently measured hit.

8. The method of claim 1, wherein the measured hit rate, and the time of measurement, each correspond to a Doppler shift of a first polarity, further comprising:
maintaining, for each of the plurality of cells, the time of last detection, the measured hit rate, and a mean Doppler speed, corresponding to the Doppler shift of the first polarity; and
maintaining, for each of the plurality of cells, a second time of last detection, a second measured hit rate, and a second mean Doppler speed, corresponding to a Doppler shift of a second polarity that is opposite of the first polarity.

9. The method of claim 1, further comprising:
maintaining, for each of the plurality of cells, a time of last update;
determining, for one of the plurality of cells, in the absence of a hit in the one of the plurality of cells, if the time of last update is greater than the inverse of the hit rate; and
if the time of last update is greater than the inverse of the hit rate, updating the hit rate.

10. The method of claim 1, wherein the measured signal strength that is received in the step of receiving is signal strength above a CFAR signal strength threshold.

11. The method of claim 1, wherein the signal strength threshold is the same for each of the plurality of cells.

12. The method of claim 1, wherein the signal strength threshold for at least two of the plurality of cells is different than one another.

13. A non-transitory computer readable medium storing program code adapted to be run on a computer processor for processing a radar hit from an object, the program code comprising:
receiving, for one of the plurality of cells corresponding to the object, a measured signal strength, a measured hit rate and a time of measurement;
identifying the object in the one of a plurality of cells of a radar field as clutter if the measured hit rate is greater than a hit rate threshold, and the measured signal strength is less than a signal strength threshold; and
updating the measured hit rate using a running average of the hit rate.

14. The non-transitory computer readable medium storing program code of claim 13, further comprising:
receiving, for the one of the plurality of cells, a measured Doppler speed; and
the step of identifying the object as a clutter further requiring that the measured Doppler speed is less than a pre-determined factor of a mean Doppler speed for the object to be identified as clutter.

15. The non-transitory computer readable medium storing program code of claim 14, wherein the measured hit rate, and the time of measurement, each correspond to a Doppler shift of a first polarity,
the program further comprising:
maintaining, for each of the plurality of cells, a time of last detection, the measured hit rate, and a mean Doppler speed, corresponding to the Doppler shift of a first polarity; and
maintaining, for each of the plurality of cells, a second time of last detection, a second measured hit rate, and a second mean Doppler speed, corresponding to a Doppler shift of a second polarity that is opposite of the first polarity.

16. The non-transitory computer readable medium storing program code of claim 13, wherein the running average is calculated using one of an infinite impulse response filter and a finite impulse response filter.

17. The non-transitory computer readable medium storing program code of claim 13, wherein the step of updating further comprises updating the signal strength threshold based on the hit rate of the one of the plurality of cells.

18. The non-transitory computer readable medium storing program code of claim 17, wherein the updating of the signal strength threshold is based on a linear relationship between the measured hit rate and the signal strength threshold.

19. The non-transitory computer readable medium storing program code of claim 13, wherein the measured signal strength, the measured hit rate and the time of measurement of each of the plurality of cells are based on hits having a Doppler polarity the same as a Doppler of a currently measured hit.

20. The non-transitory computer readable medium storing program code of claim 13, further comprising:
maintaining, for each of the plurality of cells, a time of last update;
determining, for one of the plurality of cells, in the absence of a hit in the one of the plurality of cells, whether the time of last update is greater than the inverse of the hit rate; and
if the time of last update is greater than the inverse of the hit rate, updating the hit rate.

21. The non-transitory computer readable medium storing program code of claim 13, wherein the measured signal strength that is received in the step of receiving is a signal strength above a CFAR signal strength threshold.

* * * * *